United States Patent Office 3,495,584
Patented Feb. 17, 1970

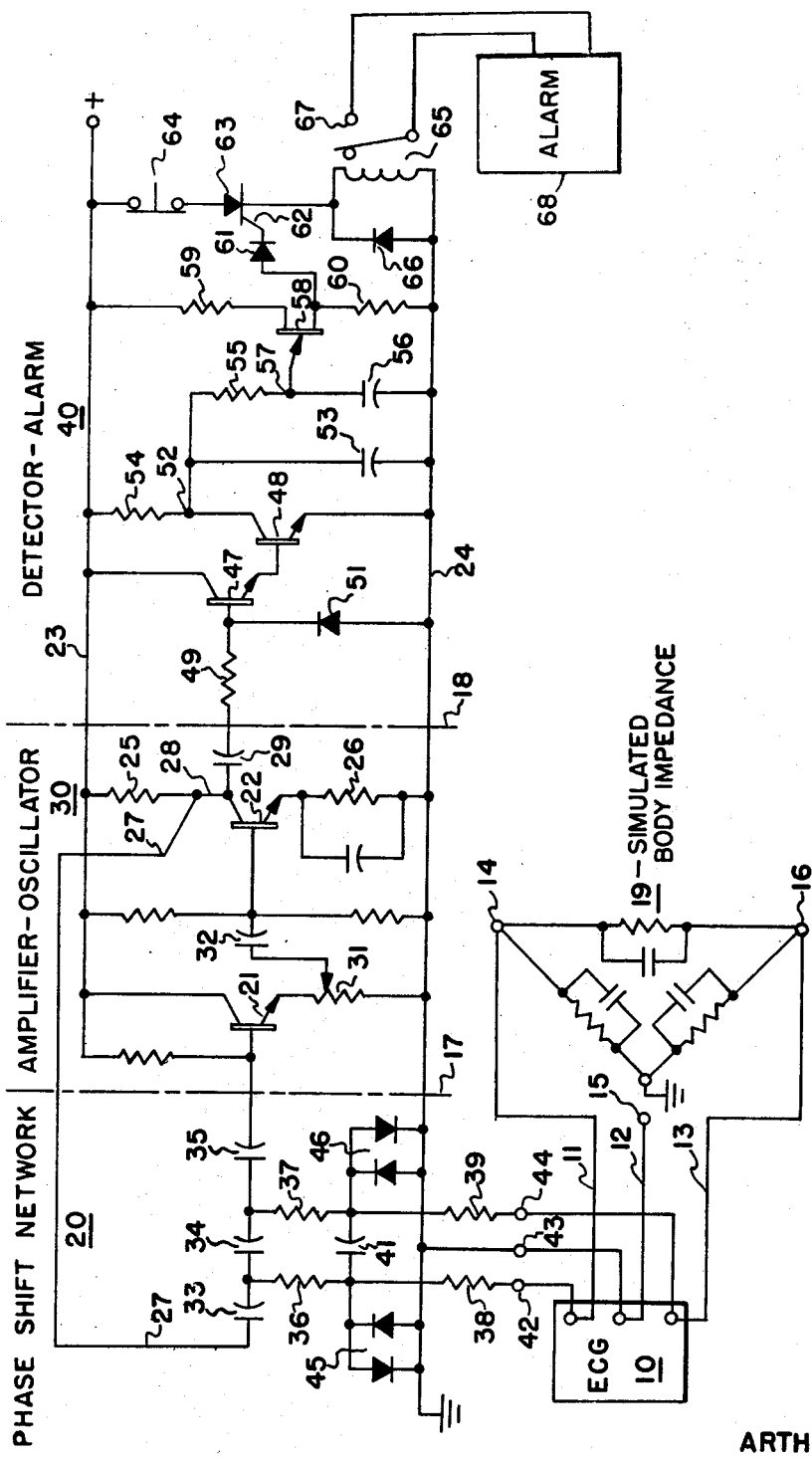

3,495,584
LEAD FAILURE DETECTION CIRCUIT FOR A CARDIAC MONITOR
Arthur W. Schwalm, Minneapolis, Minn., assignor to General Electric Company, a corporation of New York
Filed June 3, 1965, Ser. No. 460,916
Int. Cl. A61b 5/02
U.S. Cl. 128—2.06       6 Claims

ABSTRACT OF THE DISCLOSURE

Failure of the leads or the electrodes that connect a cardiac monitor to a body is detected by using the body as part of the impedance of a low voltage phase-shift bridge. The bridge is in the feedback circuit of an oscillator. The impedance of the bridge changes when there is a poor lead or electrode circuit and causes the oscillator output to change. The output change is detected and used to operate a lead failure alarm.

---

This invention is for monitoring the integrity of electric circuits involving a living subject and medcal electronic instruments. A typical and important application of the invention is to detect lead failures in electrocardiographs that are part of a system for monitoring various body functions of patients who are under intensive care following a heart attack.

In addition to the electrocardiograph, patient monitoring systems usually include a manually controlled defibrillator and a cardiac Pacemaker. If the electrocardiograph signals are indicative of an abnormality in the subject's heart action, visual and audible warning signals are produced which alert the attendant to the fact that emergency measures must be taken. If cardiac fibrillation has occurred, the defibrillator may be turned on manually to apply to the subject a limited number of high power electric pulses that arrest heart action momentarily in expectation that when defibrillation is stopped that the normal rhythm of the heart will return naturally. If an arrhythmic or irregular beat has been signaled, use of the extenal Pacemaker may be in order, in which case comparatively low energy electric pulses are applied to the body at a repetition rate that corresponds with the normal and desired rate of the heart. When the subject is brought through these emergency situations, external stimulation is discontinued but held in readiness until convalescence is essentially complete.

From the foregoing remarks, it may be seen that it is of critical importance to be able to detect any malfunction in the circuit that includes leads which run between the electrodes that are attached to the human body for picking up the heart's electric signals and the electrocardiograph. If a lead failure occurs, spurious warning signals may be given which are not related to abnormal heart action, or on the other hand, a needed warning signal may not be given when an abnormal condition actually is taking place. It is also evident that during an emergency situation, high and low energy sources of electricity may be connected to the body at the same time as the electrocardiograph which depends for its operation on the very low energy and rhythmic electric signals that are produced by the heart and which are detectable on the skin of the subject.

Accordingly, a general object of the present invention is to provide an improved method for detecting failures in the electrode connections to the subject.

More specific objects are to provide a lead failure detection device: that does not interfere with and is not affected by the other electric signals which may be present; that, in particular, does not degrade the electrocardiograph signals in any way; that will work with any type of body electrodes; that will detect a failure in any of the several electrodes that are used to pick up the electrocardiograph signals; that employs alternating voltage to insure nonpolarization of the electrodes on the body; that has and is maintained at low enough energy levels to in no way endanger or affect the subject; that has a high input impedance; that is able to withstand high voltage pulses; and, that does not give false alarms which might be interpreted as an abnormality in the subject's heart signals when there is in fact nothing more than a defective connection to the subject.

In general terms, the invention is characterized by an oscillator which makes use of feedback voltage to produce oscillations. The subject is connected into the feedback circuit by means of the leads and electrodes that are being monitored and the level of feedback voltage is adjusted to insure oscillation. Feedback voltage depends in part on the impedance of the subject and the leads. In the event of a fault or failure in the leads, the impedance and hence the feedback voltage change to thereby stop oscillation. The oscillations are continuously detected, and in their absence, an alarm is actuated after a predetermined delay. After the fault is remedied, the device may be reset. The lead failure alarm is independent and distinctly different from the warning which the attendant gets from the electrocardiograph when it senses that the subject's heart rate has exceeded predetermined high or low safe limits.

An illustrative embodiment of the invention will now be described in greater detail in reference to the drawing which shows a schematic representation of the new lead failure detector connected with an electrocardiograph and a simulated living subject.

In the drawing there is an electrocardiograph marked with the usual designation ECG and further identified by the reference numeral 10. Running from the electrocardiograph are three leads 11, 12, and 13 which terminate respectively in body adhering electrodes 14, 15, and 16. These electrodes may be any of the well-known types that are held on the body of the subject with their own pressure sensitive adhesive or they may comprise metal elements which are taped to the body. It is the integrity of these electrodes and the leads between them and the electrocardiograph with which this invention is primarily concerned.

The electrical characteristics of the body are simulated by a delta connected group 19 of equivalent impedances which comprise resistance and capacitance. A typical subject may present a body capacitance of about 1500 picofarads and a resistance of around 150 to 200 ohms. These values vary with the size of the subject and the location of the electrodes on his body.

The new device for detecting the condition of the electrocardiograph leads is divided into three sections by broken lines 17, 18. These sections are a phase-shift network 20, an amplifier-oscillator 30, and a detector-alarm section 40.

Amplifier-oscillator 30 may be designed to oscillate at a frequency at which the equivalent impedance 19 of the subject's body is relatively low. The circuit elements in the present example are such as to result in oscillation at five kilocycles, but in another commercial embodiment, oscillation is at seven kilocycles. Amplifier-oscillator 30, which will hereafter be called oscillator 30 for brevity, includes two transistors 21 and 22. The transistors are connected across a positive line 23 and a negative or ground line 24. The potential difference between these lines in a practical case is twelve volts where transistor 21 is a 2N3391 and transistor 22 is a 2N2712. Transistor 22 is connected in the common emitter configuration with a ten kilohm collector resistor 25 and a 220 ohm emitter resistor 26. From the collector of transistor 22 there is a conductor 27 running to the phase-shift network 20. During normal operation of this illustrative embodiment, a 5-kilocycle, 4 volts peak-to-peak alternating waveform appears at point 28 which is the collector of transistor 22. This voltage is coupled with the detector 40 circuit by means of a capacitor 29.

Some of the feedback current that is taken from collector 28 by way of feedback line 27 is affected by the phase-shift network 20 and fed to the base of transistor 21 which is connected as an emitter-follower or in the common collector configuration. The gain of transistor 21 and, hence the oscillator, is controlled by a potentiometer 31 in the emitter circuit. The output of this potentiometer is returned to the base of transistor 22 by means of a coupling capacitor 32.

Phase-shift network 20 is essentially a conventional ladder network that includes three series-connected capacitors 33, 34, and 35 all of which may have 100-picofarad capacitance. Intermediate the series-connected capacitors are connected a pair of 47-kilohm resistors 36 and 37 and these are bridged by a .005 microfarad capacitor 41. In series with each of the resistors 36 and 37 are additional resistors 38 and 39 which, together with the capacitor 41, are used to balance out the capacitance of electrocardiograph leads 11, 12, and 13.

Capacitors 33, 34, and 35 taken in conjunction with the resistors 36 and 37 and the resistances connected in series with the latter, shift the phase of the feedback signal coming in on conductor 27, 180° before it is introduced into the base of transistor 21. Because transistor 22 is connected in a configuration that shifts phase another 180°, there is a total of 360° of phase shift which results in positive, in-phase feedback. The parameters of the phase-shift network 20 are so chosen, taking into consideration the equivalent body impedance 19, that oscillator 30 will only oscillate if the total impedance of the network remains the same.

It may be seen that the impedance of body equivalent 19 is incorporated in the phase-shift network by conductors which run from the electrocardiograph terminals to the network terminals 42, 43, and 44. Thus, if any of the electrocardiograph leads 11, 12, or 13 breaks or becomes loosened from the electrocardiograph 10 or from the body electrodes 14, 15, or 16, or if these electrodes have their electric contact with the body impaired, an impedance change will be sensed by the phase-shift network and oscillator 30 will stop oscillating instantaneously. Note that failure is detected in the same way in any one of the three leads regardless of the fact that one of them may be at ground potential.

With this phase-shift sensing network, it should be noted that the sensing current has a high frequency and as a result, does not interfere with the low energy heart signals which are recorded in electrocardiograph 10 whose frequency response range is on the order of zero to 300 cycles ordinarily. It should also be noted that the potential applied to the patient by way of the phase-shift network is very small. Only four volts peak-to-peak is applied to the network from the collector of transistor 22 and most of this voltage is dropped across the two 47-kilohm resistors 36 and 37 and the other resistors 38 and 39 which are effectively in series with each other and the subject's body. As pointed out above, the body presents a very low impedance at the operating frequency so that the voltage on the body, due to the lead failure detection circuit, is inconsequential.

As a further precaution against significant voltage being applied to the body by way of phase-shift network 20 and to preclude interference with the lead failure detector by signals from a manually controlled defibrillator or an external Pacemaker, there are provided pairs of forward-and-reverse-connected diodes 45 and 46. These diodes are connected in a path which is effectively between phase-shift network terminals 42, 43, and 44 and ground line 24. Any unwanted signal that is impressed on these diodes will be conducted to ground harmlessly through the small forward impedance of one diode or another in the pairs. The arrangement is such that unwanted signals of either polarity are conducted with equal facility.

It is also important to note that because the lead failure sensing current that is impressed on the body is alternating at relatively high frequency, it does not tend to polarize body electrodes 14, 15, and 16. Polarization of these electrodes would, of course, adversely affect the magnitude of the signal which are being picked up from the body by electrocardiograph 10.

As mentioned earlier, when the phase-shift network is unimpaired, oscillator 30 has about four alternating volts peak-to-peak on its collector 28. This voltage is impressed on detector-alarm circuit 40 by means of coupling capacitor 29. The alarm circuit includes a pair of 2N2712 transistors 47 and 48 which are connected in a common emitter configuration to form the well-known Darlington amplifier. In series with capacitor 29 is a 5.6 kilohm resistor 49 which is connected to ground line 24 through a diode 51. This diode and capacitor 29 then act as a peak detector of the 5-kilocycle voltage. The positive signal is applied to the base of transistor 47 whose emitter is connected to the base of transistor 48 for being amplified further thereby. It may be seen that whenever oscillator 30 is producing a high frequency voltage, corresponding with normal lead impedance, that the base of transistor 47 will be positively biased and the transistor 47 will be conducting. Transistor 48 will be biased likewise and conducting so as to effectively connect its collector or the point 52 on it to ground through the low impedance path which it presents when conducting. As a result, a capacitor 53 connected between collector terminal 52 and ground, will have a voltage on its that corresponds with the small impedance of transistor 48 while it is conducting. If a lead failure occurs, the oscillator stops in which case a positive bias is no longer applied to the base of transistor 47. This cuts off both transistors 47 and 48, and causes the voltage on collector terminal 52 to rise essentially to the positive polarity on line 23 which may be 12 or more volts. This causes capacitor 53 to be charged essentially to supply voltage through collector resistor 54 which may have a value of one kilohm. As soon as capacitor 53 is charged, current begins to pass through an adjacent series circuit including a 100 kilohm resistor 55 and a 2.2 microfarad capacitor 56. At a point 57 intermediate resistor 55 and 56 is connected the emitter of a unijunction transistor 58 which may be a type 2N2646. Its base leads are respectively connected across the source in series with a 470 ohm resistor 59 and a one kilohm resistor 60.

Those versed in the art will appreciated that when capacitor 53 is uncharged, capacitor 56 will also be uncharged so that no voltage will appear at point 57 and the emitter of unijunction 58. When there is a lead failure, however, capacitor 56 charges up to the firing point of unijunction 58 through high resistance 55. In a practical case, the time constant for the circuit including capacitor 56 is about 0.5 seconds, which means that there is a delay of this length before unijunction 58 conducts following any impedance change in the leads between the electrocardiograph 10 and simulated body 19.

When unijunction 58 begins conducting, a voltage is developed across its base resistor 60 which is supplied through a diode 61 to the trigger electrode 62 of a silicon controlled rectifier 63. As is well-known, voltage from the unijunction triggers SCR 63 thereby rendering it conductive. Controlled rectifier 63 is connected in series with a reset switch 64 and a relay coil 65 which is shunted by a protective diode 66.

Relay 65 may actuate switch contact 67 to close an alarm 68 circuit which ordinarily includes a flashing lamp, an audible alarm, and means for disabling the Pacemaker and high and low heart rate alarm circuits which are customarily used in patient monitoring systems. When the lead condition abnormality is corrected, in this illustrative example of the invention, one may operate pushbutton switch 64 to remove the positive supply voltage from the anode of SCR 63 to thereby restore it to its nonconductive state. This will extinguish the alarms and may restore other devices that are under the control of relay 65 to their normal state.

When the lead malfunction is remedied, oscillator 30 will oscillate again and develop a voltage on its collector 28 which will render transistors 47 and 48 conductive to thereby return capacitor 53 to its short-circuited condition. As explained above, this will hold SCR 63 in its nonconductive state until another impedance discontinuity occurs in the phase-shift network as a result of the impedance of the electrocardiograph leads 11, 12, or 13 increasing or decreasing.

In summary, there has been described a lead failure detection device that includes the leads being monitored in the feedback circuit of a relatively high frequency oscillator whose oscillations are interrupted to produce an alarm signal if any variation occurs in the impedance of the feedback circuit. Although the details of the particular type of oscillator and the values of its circuit components have been given and although the phase-shift means has been described as a phase-shift network, it will be understood by those versed in the art that other oscillators and feedback circuits may be employed and that other oscillation frequencies may be used without departing from one of the basic concepts of the invention which is to incorporate the patient and the leads in the feedback circuit. Moreover, other alternatives may also thereby take advantage of the fact that only currents and voltages of alternating character and small magnitude are impressed on the body in which case there is no interaction with other electrical devices that may be used in connection with patient monitoring. Accordingly, the scope of the invention is to be determined only by construing the claims which follow.

It is claimed:
1. A system for monitoring the condition of an electric circuit including a subject and a device that is connected to the subject for transferring electric signals, comprising:
   (a) an oscillator that produces an output voltage under normal circuit conditions,
   (b) a feedback circuit connected between the output and input of the oscillator, the said oscillator depending for oscillation on a predetermined impedance existing in the feedback circuit, and
   (c) means connecting said feedback circuit to include therein the impedance of the subject and the circuit being monitored,
   (d) whereby a change in impedance of the monitored circuit will change the output voltage of the oscillator to thereby serve as an indication of an abnormal condition in the monitored electric circuit.
2. A system for monitoring the impedance of the conductive leads between a subject and an electrocardiograph comprising:
   (a) an oscillator having an input and an output terminal on the latter of which a predetermined alternating voltage is present when the impedance in circuit with the leads being monitored has a predetermined value,
   (b) a high impedance feedback circuit connected to introduce a part of the alternating current from the output terminal to the input terminal to sustain oscillation and the alternating voltage on the output terminal, means for connecting said feedback circuit to the leads to thereby include in the feedback circuit the lead and subject impedance to accrue the impedance that is necessary to sustain oscillation,
   (c) whereby a change in the impedance in circuit with the leads being monitored will interrupt oscillation to serve as an indication of abnormal impedance in the leads.
3. The invention set forth in claim 2 including:
   (a) detector means connected to detect the presence of the alternating voltage on the output terminal,
   (b) an alarm circuit means including a switch means, and
   (c) means responsive to signal from the detector means that render the switch means conductive.
4. A system for monitoring the integrity of the conductive leads between a subject and an electrocardiograph, comprising:
   (a) an oscillator having an input terminal and an output terminal on the latter of which a predetermined alternating voltage is present when a voltage on the output terminal is substantially in-phase with a voltage on the input terminal,
   (b) a phase-shift feedback network that is supplied from said output terminal and the output of which is connected with said input terminal, the said oscillator depending for sustaining oscillation and the voltage on the output terminal on the amount of phase-shift occurring in the network,
   (c) the said network having at least a pair of terminals which may be connected to supply alternating feedback voltage to electrocardiograph leads and a subject in circuit therewith, whereby to control the amount of phase-shift needed to sustain oscillation, and
   (d) detector means for detecting alternating voltage on the output terminal of the oscillator to indicate if the desired amount of phase-shift is being introduced between the network terminals and to indicate the integrity of the circuit including the electrocardiograph leads.
5. The invention set forth in claim 4 including:
   (a) an alarm circuit and a switch means in circuit therewith, and
   (b) means responsive to the output signal of the detector means to control the switch means and alarm circuit.
6. The invention set forth in claim 4 wherein:
   (a) said feedback network includes a plurality of series connected capacitors,
   (b) a resistance means that has a high ohmic value in comparison with the impedance of the subject connected intermediate said capacitors and in series with a terminal of the network, and
   (c) whereby to cause most of the voltage drop in the feedback circuit to occur in the said resistance means instead of in the subject that is in circuit with the leads being monitored.

References Cited

UNITED STATES PATENTS

| | | | |
|---|---|---|---|
| 2,709,784 | 5/1955 | Spaulding | 324—52 |
| 2,794,071 | 5/1957 | Hughes et al. | 179—15 |
| 3,144,018 | 8/1964 | Head | 128—2.1 |
| 3,207,151 | 9/1965 | Takagi | 128—2.1 |
| 3,312,791 | 4/1967 | Markl et al. | 179—175.3 |
| 3,316,896 | 5/1967 | Thomasset | 128—2.1 |

WILLIAM E. KAMM, Primary Examiner